United States Patent
Seymour

(10) Patent No.: US 7,937,417 B2
(45) Date of Patent: May 3, 2011

(54) MOBILE COMMUNICATION TERMINAL AND METHOD

(75) Inventor: James Seymour, Middlesex (GB)

(73) Assignee: Nokia Corporation, Espoo (FI)

( * ) Notice: Subject to any disclaimer, the term of this patent is extended or adjusted under 35 U.S.C. 154(b) by 261 days.

(21) Appl. No.: 11/402,283

(22) Filed: Apr. 11, 2006

(65) Prior Publication Data

US 2007/0239687 A1 Oct. 11, 2007

(51) Int. Cl.
G06F 17/30 (2006.01)

(52) U.S. Cl. ........ 707/805; 707/661; 707/706; 707/722; 707/736; 707/758; 707/781; 707/791; 707/803; 707/804; 707/809; 707/812; 725/87; 709/228; 709/204; 709/203; 709/217; 709/219; 715/273; 715/716; 715/854

(58) Field of Classification Search .......... 707/661, 707/706, 722, 736, 758, 781, 791, 803, 804, 707/809, 812, 999.101, 999.102, 999.103; 725/87; 709/228, 204, 203, 217, 219; 715/273, 715/716, 854

See application file for complete search history.

(56) References Cited

U.S. PATENT DOCUMENTS

| | | | | |
|---|---|---|---|---|
| 5,864,868 | A * | 1/1999 | Contois | 707/104.1 |
| 6,356,971 | B1 * | 3/2002 | Katz et al. | 710/301 |
| 6,407,680 | B1 * | 6/2002 | Lai et al. | 341/50 |
| 6,452,609 | B1 * | 9/2002 | Katinsky et al. | 715/716 |
| 2001/0043795 | A1 * | 11/2001 | Wood et al. | 386/69 |
| 2003/0172079 | A1 * | 9/2003 | Millikan et al. | 707/100 |
| 2003/0229900 | A1 * | 12/2003 | Reisman | 725/87 |
| 2004/0078357 | A1 * | 4/2004 | LaChapelle et al. | 707/2 |
| 2005/0008325 | A1 * | 1/2005 | Ollis et al. | 386/46 |
| 2006/0195521 | A1 * | 8/2006 | New et al. | 709/204 |
| 2007/0233816 | A1 * | 10/2007 | Odenwald | 709/219 |

* cited by examiner

Primary Examiner — Syling Yen
(74) Attorney, Agent, or Firm — Perman & Green, LLP

(57) ABSTRACT

A method for handling media files having attributes is disclosed. A user-configurable play criteria specification is provided, and the method involves automatically selecting and performing a current media file having at least one attribute in compliance with the play criteria specification. Moreover, the method involves receiving a user input indicative of a desired play criterion, the desired play criterion being related to at least one attribute of the current media file, and updating the play criteria specification to include the desired play criterion.

15 Claims, 10 Drawing Sheets

| Artists | |
|---|---|
| Cilea | > |
| Coco Lee | > |
| 508 — Coldplay | > |
| Coleske | > |
| The Connells | > |
| The Corrs | > |

*Fig 5c*

| Coldplay | |
|---|---|
| All | > |
| Parachutes | > |
| 510 — X & Y | > |

*Fig 5d*

MOBILE COMMUNICATION TERMINAL AND METHOD

FIELD

The disclosed embodiments generally relate to media file handling in a media player, and more particularly to a method for handling media files having attributes, where a user-configurable play criteria specification is provided and where a current media file, which has at least one attribute in compliance with the play criteria specification, is automatically selected and performed. The aspects of the invention also relate to an associated media player apparatus and computer program product.

BACKGROUND

Media players are today present in various kinds of electronic equipment. Examples of such equipment include a portable media player apparatus for digital audio files like MP3 (e.g. portable MP3 player) or AAC (e.g. Apple® IPod®); a mobile communication terminal (e.g. a mobile phone) with an included media player application, a palmtop or personal computer with an included media player application, a compact disk player, a digital versatile disk player, a minidisk player, a game console, a digital camera, a home stereo and a car stereo. Nowadays, many of the apparatuses mentioned above often both have a large storage capacity and are capable of accessing one or more remote sources of media files over a communications network such as the Internet. In effect, this means that for a typical media player user, there is likely to be a considerable number of media files available for playback. In practice, it is necessary to provide some sort of control for the media player user over such vast numbers of available media files.

One way of providing such control is the provision of user-configurable playlists. A playlist may be described as a restriction from a universal (total) set of available media files for the media player down to a typically smaller set of currently selectable media files. By "currently selectable" means that the choice of a certain playlist by the user will cause the media player to restrict its forthcoming selections of media files to be performed (for instance in normal sequential order or in random order) to the media files that are on the playlist.

By defining different playlists, the user may sort the available media files into different categories which often correspond to different attributes of the media files, like Album, Artist or Genre if the media files are audio files containing music. Thus, the user may define a playlist which contains heavy metal songs, and another which contains music from a particular artist or from a particular album. Alternatively, the user may of course define playlists where the media files on the list have something else in common, perhaps simply representing a certain collection of favorite songs for the particular user.

Another way of assisting the user to control a vast number of available media files is the provision of a random or shuffle mode of playback. As is well known, in random (shuffle) mode the media files are automatically selected and performed one by one by the media player in random order, thereby relieving the user of the manual actions otherwise required for specifying each media file which is to be performed next. Random mode operation can be based on a specified playlist, on a specified attribute value (such as a particular album or artist), or on the universal set of media files that are available to the media player.

While the use of playlists and random mode operation in prior art media players certainly has its benefits, there are still some shortcomings, as will now be briefly explained.

Playlists have a limited length, either in the form of an explicit maximum length permitted by the media player (e.g. 20 songs), or for practical reasons because longer playlists become increasingly difficult for the user to manage. This is particularly so for a media player apparatus having a small physical size and therefore limited user interface and processing power (as is the case with for instance a portable MP3 player, Apple® IPod® or mobile phone).

Therefore, for a media player with a very large number of media files available (ranging from perhaps a couple of hundreds to several thousands), the user will have to create a large number of different playlists if he wants to group his media files into different categories. However, with a large number of playlists, it will be difficult for the user to remember the particular playlist or playlists which contain(s) the desired music at any given moment of time.

In addition, the prior art does not provide any support for assisting the user in adapting the playback behavior of his media player in response to sudden preferential changes, mood changes or environmental changes (for instance, the sudden appearance of another person, or switching from calm work or study to physical exercise or partying).

SUMMARY

According to a first aspect of the invention there is provided a method for handling media files having attributes, wherein a user-configurable play criteria specification is provided, the method involving automatically selecting and performing a current media file having at least one attribute in compliance with the play criteria specification, the method further comprising the steps of:

receiving a user input indicative of a desired play criterion, said desired play criterion being related to at least one attribute of said current media file; and updating said play criteria specification to include said desired play criterion.

As used herein, a "user-configurable play criteria specification" means any prevailing constraint or set of constraints that controls the set of currently selectable media files from which a media file to be performed next is selected automatically in e.g. a media player application, among a universal set of available media files. From time to time, the set of currently selectable media files may be identical to the universal set of available media files (when the play criteria specification is "empty" and no constraint is currently applicable), or it may be a subset of the universal set of available media files (when the play criteria specification contains at least one criterion that prevents or disqualifies some of the media files in the universal set of available media files from belonging to the set of currently selectable media files, because they fail to comply with this at least one criterion).

Furthermore, "updating said play criteria specification" means dynamically changing said play criteria specification, often during ongoing performance of said current media file, so that the desired play criterion is included in the play criteria specification.

A further step involves automatically selecting and performing another media file having at least one attribute in compliance with the updated play criteria specification.

Advantageously, the play criteria specification is an automatic file selection and playback filter for use by a media player in a random or shuffle mode.

Said further step of automatically selecting and performing another media file may be performed only when or after performance of said current media file has been completed. Therefore, in one embodiment, the performance of the current media file is not interrupted; instead the current media file will be performed to its normal completion, and the updated play criteria specification will thus be applied when a next media file is to be automatically selected and performed. Alternatively, however, the further step of automatically selecting and performing said another media file may be performed directly, i.e. by interrupting the performance of the current media file.

The media files may include audio files with music, wherein said desired play criterion may be related to at least one attribute belonging to the group consisting of: album, artist, composer, genre, title, temporal origin, and storage location.

Particularly in embodiments where the media files are audio files containing music, they may be stored in any existing audio file format such as MP3, WMA, AAC or WAV in local or external memory. Depending on implementation, they may either be read more or less in their entirety upon selection and performance (i.e. the entire media file contents, or at least substantial parts thereof, are read from a local or remote data storage into work memory associated with a hardware or software implemented audio file processor), or they may be received in sequential data portions in a streaming manner from a remote network resource.

The media files may include digital images, such as photographs, wherein said desired play criterion may be related to at least one attribute belonging to the group consisting of: author/creator, genre, theme/subject, temporal origin, and storage location.

Additionally or alternatively, the media files may include digital video or audio/video sequences such as movies, television episodes, newcasts, sport broadcasts, commercials or music videos, wherein said desired play criterion may be related to at least one attribute belonging to the group consisting of: author, producer, director, actor(s), genre, title, episode, season, temporal origin, and storage location.

The media files which are available for automatic selection may include at least one media file of a first media type, said current media file being of a second media type, wherein said desired play criterion is related to said second media type as an attribute of said current media file.

Thus, media file type may be one possible attribute which is selectable by the user for inclusion in the play criteria specification. For instance, in a situation where the user enjoys both music files and still images in a random playback mode, he may decide to restrict the forthcoming random selections of media files to just still images, for instance if acoustic silence is suddenly needed because of changes in his own mood or the sudden appearance of another person in his vicinity.

Said step of updating said play criteria specification may involve adding said desired play criterion to any existing criterion in said play criteria specification. Additionally or alternatively, said step of updating said play criteria specification may involve deleting any existing criterion in said play criteria specification before including said desired play criterion.

In other words, the play criteria specification may either be narrowed (by adding the desired play criterion as a further constraint besides any existing one(s) in the play criteria specification), or expanded (by removing any existing constraint(s) before inserting the desired play criterion as the sole constraint in the play criteria specification). A narrowing play criterion is referred to as "Filter" in following sections of this document, whereas an expanding play criterion is referred to as "Expand".

In one or more embodiments, said step of receiving a user input involves:
determining a plurality of attributes of said current media file;
generating a plurality of user-selectable play criterion options from the determined attributes;
displaying the generated play criterion options;
detecting selection by a user of at least one of the play criterion options; and
generating the desired play criterion from the or each selected play criterion option.

Thus, in some embodiments, the media player has functionality that allows convenient selection by the user of how the play criteria specification is to be updated. This may be obtained by presenting a list of selectable options on a display of the apparatus in which the media player is embodied. The items in the list of selectable options will relate to the respective values of different attributes of the current media file, as determined in said step of determining. The selection of one item in the list of selectable options may be done by way of an input device of the apparatus in which the media player is embodied. In one embodiment, the selectable options represent both narrowing and expanding play criteria, as explained above, such as Artist Expand, Album Expand, Genre Expand, Composer Expand and Genre Filter.

A second aspect of the invention is a media player apparatus having a controller and a user interface with an output device and an input device, the controller being adapted to provide media player functionality for automatically selecting and performing a current media file having at least one attribute in compliance with a play criteria specification, wherein the controller is further adapted to:
receive a user input from said input device indicative of a desired play criterion, said desired play criterion being related to at least one attribute of said current media file; and
update said play criteria specification to include said desired play criterion.

Furthermore, the controller in the media player apparatus of the second aspect may be adapted to perform the same or corresponding steps as has been explained above for the method according to the first aspect.

In one embodiment, the controller is adapted to provide the play criteria specification as an automatic file selection and playback filter for use by a media player in a random or shuffle mode.

The media player apparatus may be embodied in or as an apparatus selected from the group consisting of a portable media player apparatus for digital media files, a mobile communication terminal, a palmtop computer, a personal computer, a compact disk player, a digital versatile disk player, a minidisk player, a game console, a digital camera, a home stereo or a car stereo.

A third aspect of the invention is a computer program product comprising machine-readable instructions that, when executed by a processor, performs the method according to the first aspect.

Other objectives, features and advantages of the invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the invention will now be described in more detail, reference being made to the enclosed drawings, in which:

FIGS. 5a to 5l illustrate screenshots of a display of a media player apparatus, taken during typical use cases involving automatic playback of digital music files with adaptable random play.

DETAILED DESCRIPTION OF THE INVENTION

Figure 1:
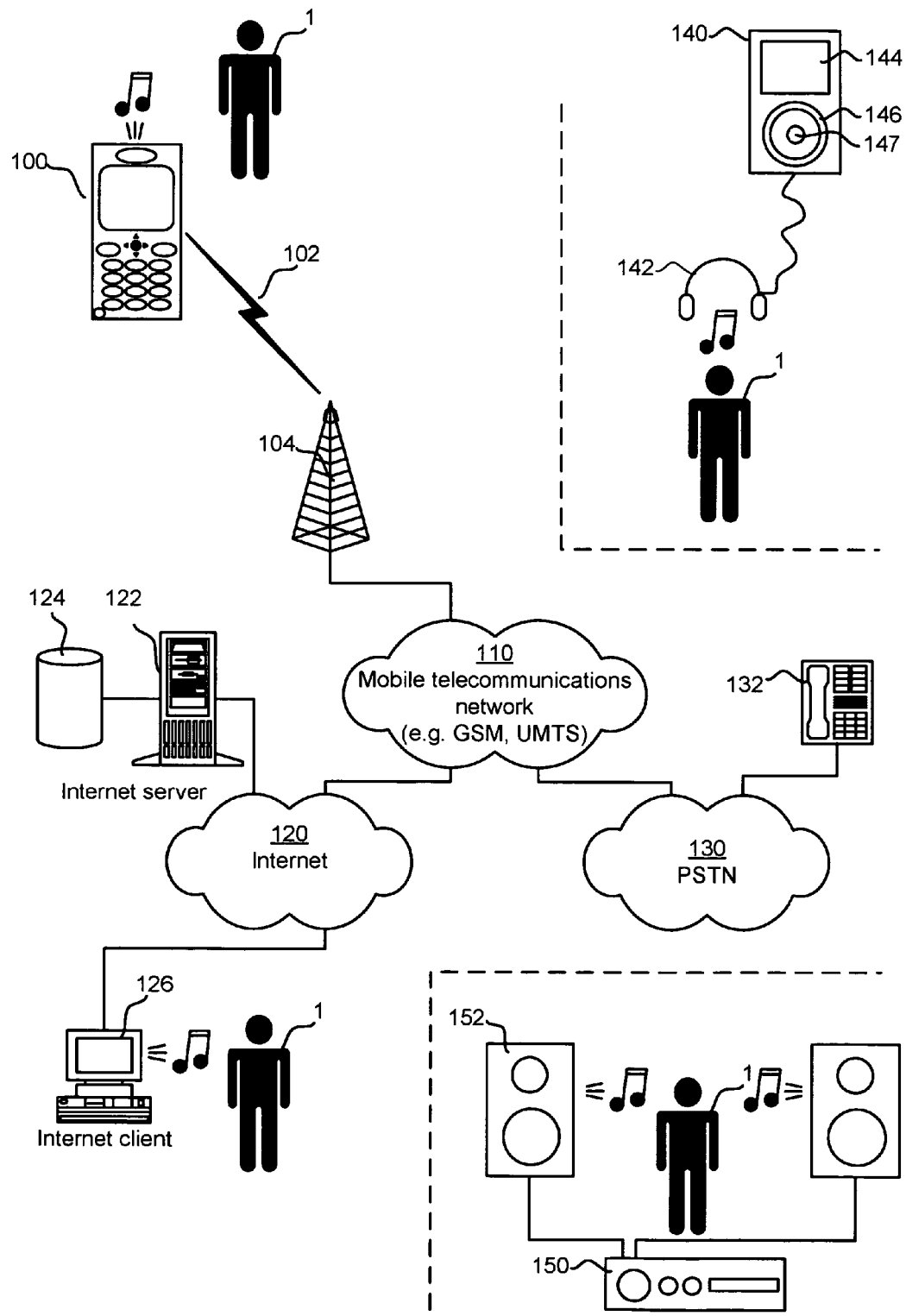
FIG. 1 is a schematic illustration of different typical but non-limiting examples of environments in which different embodiments of the invention may be exercised.

FIG. 1 illustrates, in a non-limiting manner, four different examples of environments in which a user 1 may use a media player with the improved media file handling offered by aspects of the invention.

The first example is a mobile terminal 100 which is part of a cellular telecommunications system. In the telecommunication system of FIG. 1, various telecommunications services such as cellular voice calls, www/wap browsing, cellular video calls, data calls, facsimile transmissions, still image transmissions, video transmissions, electronic message transmissions and electronic commerce may be performed between the mobile terminal 100 and other devices, such as another mobile terminal or stationary telephone 132. It is to be noted that for different embodiments of the mobile terminal 100 and in different situations, different ones of the telecommunications services referred to above may or may not be available; the invention is not limited to any particular set of services in this respect.

The mobile terminal 100 is connected to a mobile telecommunications network 110 through an RF link 102 via a base station 104. The mobile terminal 100 and the mobile telecommunications network 110 may be in compliance with any commercially available mobile telecommunications standard, including but not limited to GSM, UMTS, D-AMPS, CDMA2000, FOMA and TD-SCDMA. The external and internal parts of the mobile terminal 100 will be described in more detail below with reference to FIGS. 2 and 3.

A public switched telephone network (PSTN) 130 is connected to the mobile telecommunications network 110 in a familiar manner. Various telephone terminals, including the abovementioned stationary telephone 132, are connected to the PSTN 130.

The mobile telecommunications network 110 is operatively connected to a wide area network 120, which may be Internet or a part thereof. An Internet server 122 has a data storage 124 and is connected to the wide area network 120, as is an Internet client computer 126. The server 122 with its data storage 124 may host a www/wap server capable of serving www/wap content to the mobile terminal 100. It may also serve as a remote source of media files for the mobile terminal 100 and the client computer 126. The computer 126 may be implemented as any commercially available kind of personal computer (e.g. laptop, stationary or palmtop) or workstation, running an operating system like Win32 (e.g. Windows® XP or NT), Unix or Macintosh® OSX.

The computer 126, which has a media player application that can be executed by the operating system, is a second example of an environment in which the media file handling offered by the present invention can be exercised. To this end, the media player application may have access to media files stored in local memory in the computer 126 (such as on a hard disk or flash memory), media files retrieved remotely from e.g. the Internet server 122 (by downloading or by streaming), and media files stored on a local external data carrier (such as a CD or DVD inserted into a disk reader of the computer 126). For media files that contain music, typical file formats may be MP3, WMA, AAC, CD Audio or Sony® Super Audio CD.

A third example is a portable media player apparatus 140 for digital media files, as is seen at the upper right corner of FIG. 1. The portable media player apparatus 140 has an internal data storage, e.g. flash memory or hard disk, which is capable of storing a large number of digital media files, for instance audio files in MP3 or AAC format. Moreover, it has media playback functionality capable of reading, decoding and performing the contents of these media files to the user 1. In case of audio files, the media playback functionality supplies its acoustical output to the user by way of a speaker headset 142 or another kind of loudspeakers connected to an audio output terminal of the apparatus 140. The portable media player apparatus 140 also has a user interface involving an output device 144 (e.g. a color or monochrome LCD display) and an input device (e.g. a rotator wheel 146 with a depressible center part 147, or a set of operational keys for scrolling and selecting control operations).

A fourth example of an environment for the present invention is a home stereo 150 with associated speakers 152. The home stereo 150 will typically contain a CD or DVD player from which music tracks and other kinds of media files may be played. In addition, the home stereo 150 may have a USB port for connecting for instance a portable media player apparatus like the one described above for the second example. The home stereo 150 may also have an interface to a cable TV network or the wide area network 120.

Other exemplifying environments in which the invention may be applied include a compact disk player, a digital versatile disk player, a minidisk player, a game console, a digital camera, and a car stereo.

Figure 2:
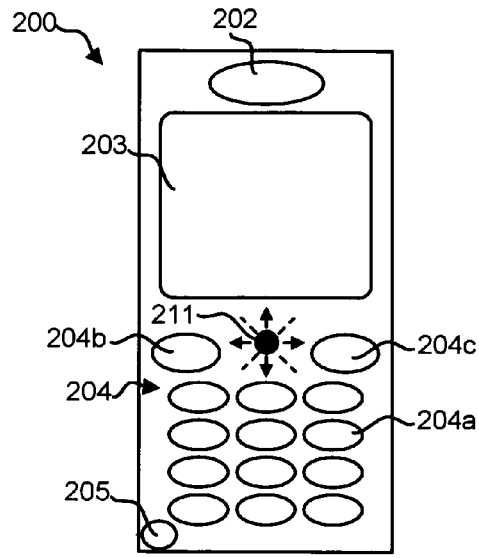
FIG. 2 is a schematic front view illustrating a mobile terminal where one embodiment of the invention is applied.

An embodiment 200 of the mobile terminal 100 is illustrated in more detail in FIG. 2. Externally, the mobile terminal 200 comprises a speaker or earphone 202, a microphone 205, a display 203 and a set of keys 204 which may include a keypad 204a of common ITU-T type (alpha-numerical keypad representing characters "0"-"9", "*" and "#") and certain other keys such as soft keys 204b, 204c. A joystick 211 or other type of navigational input device (e.g. scroll keys, touchpad, four/five-way navigation key, or rotator) is also provided. Other well known external components may be present, such as volume control keys, power-on button, battery, charger interface and accessory interfaces, but are not indicated in FIG. 2 for the sake of clarity.

Figure 3:
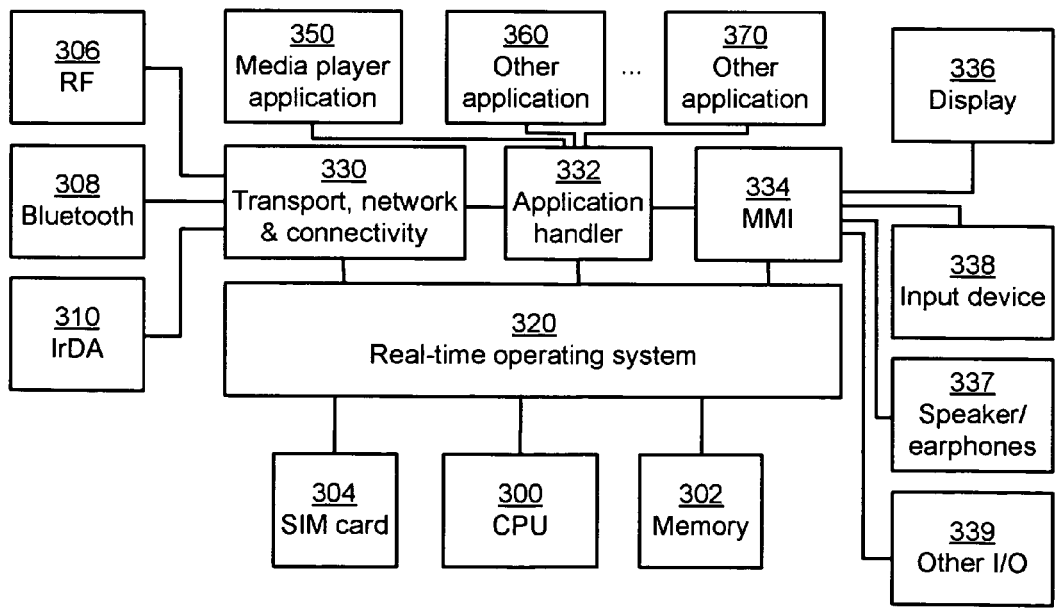
FIG. 3 is a schematic block diagram representing an internal component, software and protocol structure of the mobile terminal shown in FIG. 2.

The internal component, software and protocol structure of the mobile terminal 200 will now be described with reference to FIG. 3. The mobile terminal has a controller 300 which is responsible for the overall operation of the mobile terminal and which may be implemented by any commercially available CPU ("Central Processing Unit") or DSP ("Digital Signal Processor"), or alternatively by any other electronic programmable logic device such as an ASIC ("Application-Specific Integrated Circuit"). The controller 300 has associated electronic memory 302 such as RAM memory, ROM memory, EEPROM memory, flash memory, hard disk, or any combination thereof. The memory 302 is used for various purposes by the controller 300, one of them being for storing data and program instructions for various software in the mobile terminal. The software includes a real-time operating system 320, drivers for a man-machine interface (MMI) 334, an application handler 332 as well as various applications. The applications include the aforementioned media player application 350, as well as various other applications 360 and 370, such as applications for voice calls, video calls, messaging (e.g. SMS, MMS or email, a phone book application, a WAP/WWW browser, a calendar application, a control panel application, a camera application, video games, a notepad application, etc.

The MMI 334 also includes one or more hardware controllers, which together with the MMI drivers cooperate with the display 336/203, the keypad 204 and joystick 211 (commonly referred to as input device 338 in FIG. 3), as well as various other I/O devices 339 such as the microphone 205, the speaker 337/200, a vibrator, a ringtone generator, an LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, inter alia, band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

Figure 4:
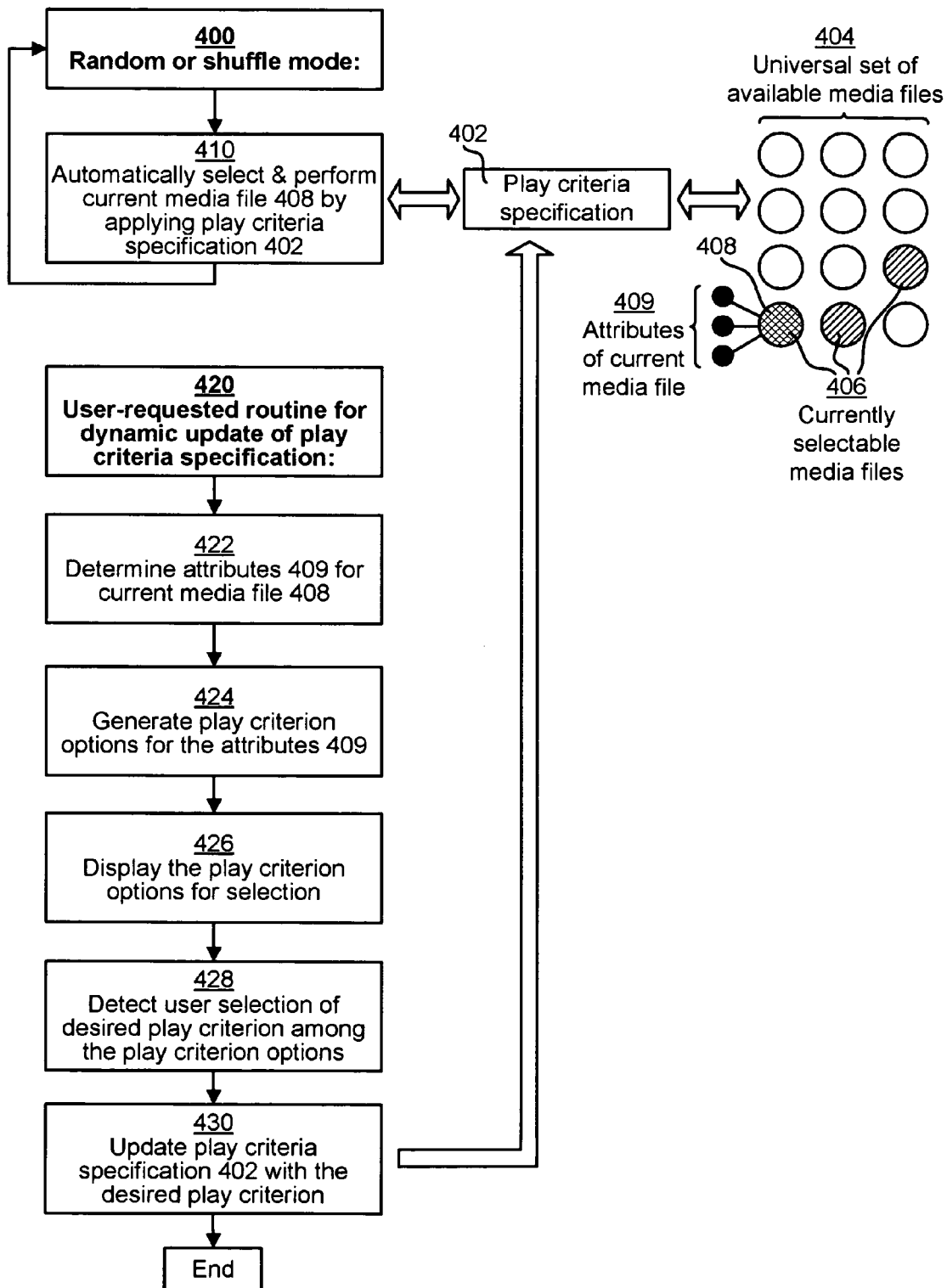
FIG. 4 is a flowchart diagram that illustrates media file handling with dynamic update of a user-configurable play criteria specification according to one embodiment.

With reference to FIG. 4, in accordance with one embodiment of the present invention, media file handling will now be described in more detail with regard to its novel and inventive functionality that provides adaptable random play with dynamic update of a user-configurable play criteria specification. This media file handling with its adaptable random play functionality may be included in any media player, including but not limited to the four examples described above for FIG. 1. Therefore, the functionality of FIG. 4 may be a part of the media player application 350 of the mobile terminal 100/200, the media player application of the computer 126, the media playback functionality or the portable media player apparatus 140, or corresponding functionality of the home stereo 150.

In either case, the media player has functionality for retrieving the content of an individual media file among a universal set of available media files 404 in a local storage and/or from a remote source (in the latter case, either by downloading the entire media file from the remote source, or sequentially reading and buffering consecutive segments thereof in a streaming manner), and performing it to the user 1, after decoding/decompression if necessary. For the rest of this description, it is assumed that the media files are digital audio files such as MP3 or AAC files, the content of which represents music. An individual media file which is being performed is referred to as the current media file in the following and is seen at 408 in FIG. 4.

Figure 6:
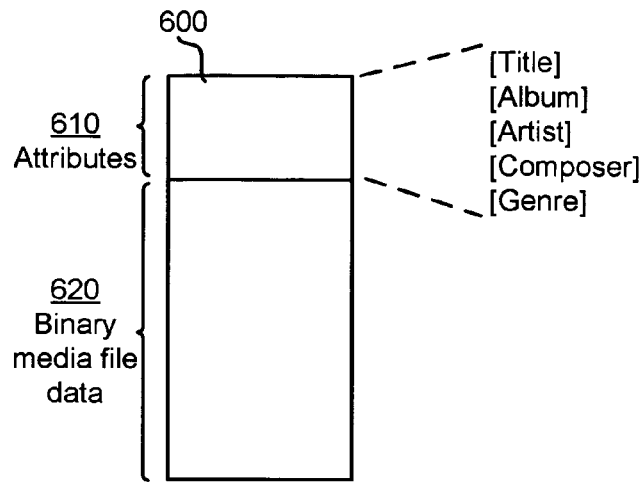
FIG. 6 is one example of an illustration of the file structure referred to with respect to FIG. 4.

Each media file in the universal set 404 has one or more attributes, including title, album, artist, composer and genre. In FIG. 4, only the attributes 409 for the current media file 408 are shown for the sake of clarity. In the case of MP3 or AAC files, the attributes are conveniently stored within the media file itself. For instance, for MP3 files, use is made of the initial ID3 tag fields that precede the binary file content in the file, as is well known per se. This is illustrated for a digital audio file 600 in FIG. 6, having attributes 610 for title, album, artist, composer and genre in the initial part of the media file, before its actual binary file content 620.

Figure 7:
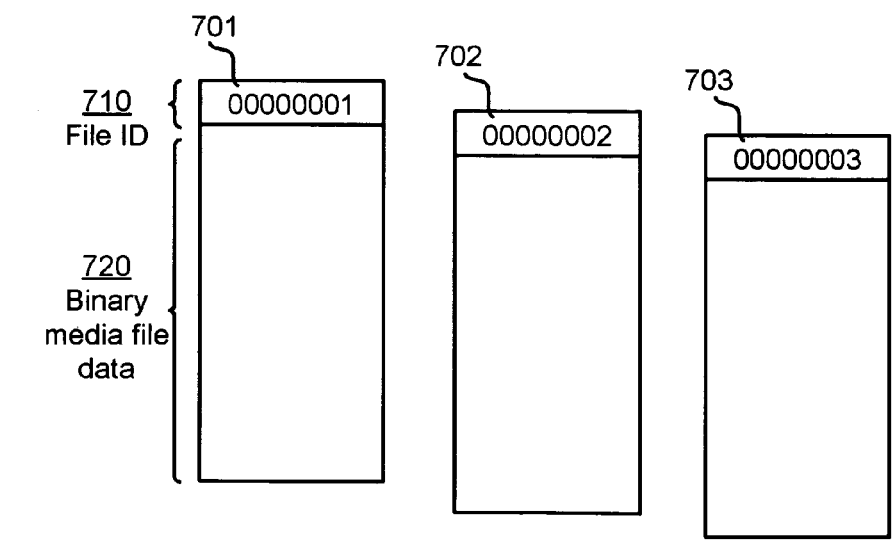
FIG. 7 is one example of a file structure that can be used to implement aspects of the disclosed embodiments.

For other kinds of media files where no such tag fields are available, the attributes may be stored in another data structure, external to the actual media files. For instance, as seen in FIG. 7, the media files 701-703 only have a file identifier part 710 and a binary file content part 720. A separate data structure 730 represents the attributes of each media file 701-703. The values of the different fields of this data structure, i.e. the attributes of the different media files 701-703, may have been input by the user 1 or may have been found by accessing a remote lookup service (e.g. Internet server 122 of FIG. 1), at the time when the respective media file was brought to the media player.

Many other kinds of attributes than the ones exemplified above are of course possible, including but not limited to temporal origin (e.g. file creation or last save date, or creation date, year, decade or century for the piece of music contained in the medial file). Another example is storage location for the media file (e.g. its filename, folder or drive in a file system, an IP address or an URL if the media file is stored at a remote source, or the name or identifier of a playlist which the media file in question is a member of). Still one example is media file type.

The media player may have several different playback modes, including one that plays through all the media files in the universal set 404 in some sort of logical order (e.g. alphabetical or chronological), others that are based on playlists created by the user 1, and still others that are limited to media files which have one attribute in common (such as songs from a particular album, songs created by a certain composer or performed by a certain artist, or music in a given genre). Also see FIGS. 5a-5l for the use cases described in later parts of this section.

One playback mode is random or shuffle mode, which upon activation by the user 1 will cause the media player to perform a first execution loop 400. A user-configurable play criteria specification 402 is provided which acts as a filter that defines which ones of the various media files in the universal set 404 that will be accessible for random selection in step 410 of the random mode loop 400.

The set of such media files which match the play criteria specification 402 is referred to as currently selectable media files 406 in FIG. 4. In step 410, the media player will automatically select one of the currently selectable media files 406 and perform it as the current media file 408 to the user 1.

In other words, the play criteria specification 402 may contain constraints defined by the user 1 as regards which media file attributes that are to be included in the filter, and what their associated values will be. For instance, the play criteria specification 402 may contain a single attribute, Genre, and its associated value may be "Pop". This will cause the automatic selection in step 410 of the random mode loop 400 to be limited to such media files 406 among all available ones 404 which have "Pop" as attribute value for their Genre attribute. Consequently, the current media file 409 has a Genre attribute 409 which has the value "Pop".

The play criteria specification 402 may also contain more than one attribute, for instance specifying that only media files with the Genre attribute equal to "Pop" and the Composer attribute equal to "John Lennon" will be currently selectable media files 406.

Both AND and OR constraints may be defined when the play criteria specification 402 contains multiple attributes.

If no constraints have been defined by the user 1, the play criteria specification 402 will be "empty", and, in effect, the set of currently selectable media files 406 will be identical to the universal set of available media files 404.

When the playback of the current media file 408 has been completed, step 410 is repeated by selecting another one of the currently selectable media files 406 to be performed as the now-current media file 408. The random mode loop 400 is repeated until one of the following events occurs: the user 1 commands exit from random mode; all files among the currently selectable media files 406 have been performed once (if endless random mode is not activated); or if endless random mode is activated, essentially "for ever" (in practice, until the media player is closed or the apparatus in which it is contained is powered off).

The media player functionality of FIG. 4 also contains an adaptable random play routine 420, in the form of a user-requested routine for dynamic update of the play criteria specification. The routine 420 is initiated by the media player upon request from the user 1 (see also FIG. 5*f* and its description further below), and in the disclosed embodiment, the routine 420 is executed concurrently with and independently of the random mode loop 400; the latter will not be aware of the execution of the former.

The routine 420 is typically invoked by the user 1 during ongoing playback of a current media file 408, but it may also be invoked when the playback of the current media file 408 has been completed, or paused or stopped by the user. In a first step 422, the media player will determine the attributes 409 of the current media file 408. Then, in steps 424 and 426, a number of play criterion options will be generated from the determined attributes 409 and displayed for selection by the user 1. See also FIG. 5*f* and the play criterion options 520.

As an example, the determined attributes of the current media file 408 may be:
 [Title]="Yesterday"
 [Album]="Help!"
 [Artist]="The Beatles"
 [Composer]="John Lennon"
 [Genre]="Pop"

To this end, the play criterion options generated and displayed may offer the user 1 different ways of modifying the filter function of the play criteria specification 402 by including at least one of the determined attributes. The modification of the play criteria specification may be expansive, meaning that all existing constraints in the play criteria specification 402 are removed before adding the attribute corresponding to the selected play criterion option, or narrowing, meaning that the selected attribute is added as a further constraint to any existing ones in the play criteria specification 402. Examples of this will be described further with reference to FIGS. 5*a*-5*l* below.

The play criterion option(s) selected by the user 1 is detected in step 428, and in step 430 the play criteria specification 402 is updated accordingly. In the disclosed embodiment, this is done on-the-fly without interrupting the ongoing performance of the current media file 408 in step 410 of the random mode loop 400. Once the current media file 408 has completed and a new media file is to be selected by the media player for performance in step 410, the updated the play criteria specification 402 will affect the set of currently selectable media files 406 from which the next-current media file may be chosen. If the play criterion option was expansive, the set of currently selectable media files 406 will be larger than before. Conversely, if it was narrowing, the set 406 will now contain fewer selectable media files.

In the disclosed embodiment 402, the play criterion specification 402 is a filter whose filter parameters are different media file attributes as configured by the user 1, and the filter is applied each time a new current media file 408 is to be selected in step 410 of the random mode loop 400. In alternative embodiments, however, the currently selectable media files 406 may be managed as a list (like a dynamically updated playlist). In such a case, the universal set of available media files 404 may be scanned in step 430 and matched against the updated play criterion specification 402 so as to generate a new list of currently selectable media files which now comply with the updated play criterion specification 402. Step 410 of the random mode loop 400 will then base its random selection on this list and does not have to apply the play criterion specification 402 at every iteration of the step 410.

Multiple selections of more than one play criterion option may be possible in step 428, and the results may be combined in various logical combinations. One example is the selection of ([Composer]="John Lennon" AND NOT ([Artist]="The Beatles"), causing the set of currently selectable media files 406 to contain music created by John Lennon and performed by him as a solo artist or with other artists than The Beatles.

Some use cases of the media player will now be described with reference to the schematic display screenshots of FIGS. 5*a*-5*l*. These use cases pertain to a situation where the media player is embodied in the portable media player apparatus 140 of FIG. 1, but they could just as well have been made for the mobile terminal 100/200 or the other exemplifying environments 126 and 150 of FIG. 1.

Figure 5A:
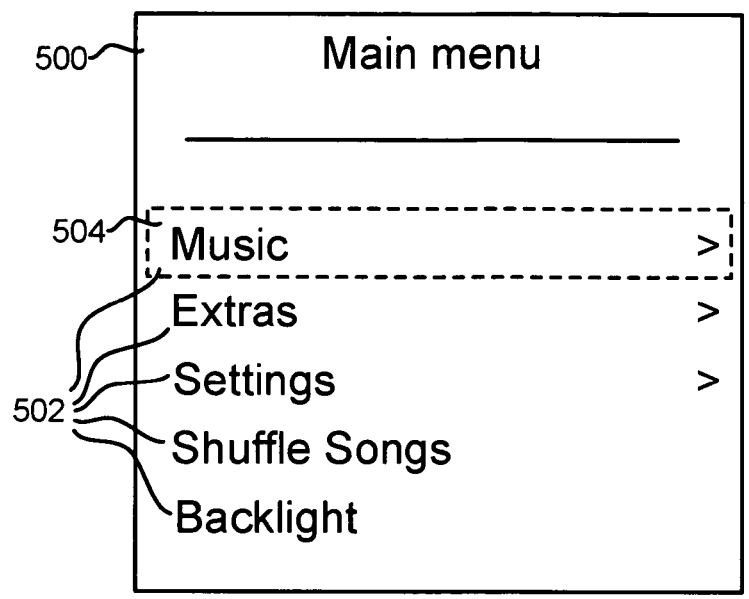
Figure 5B:
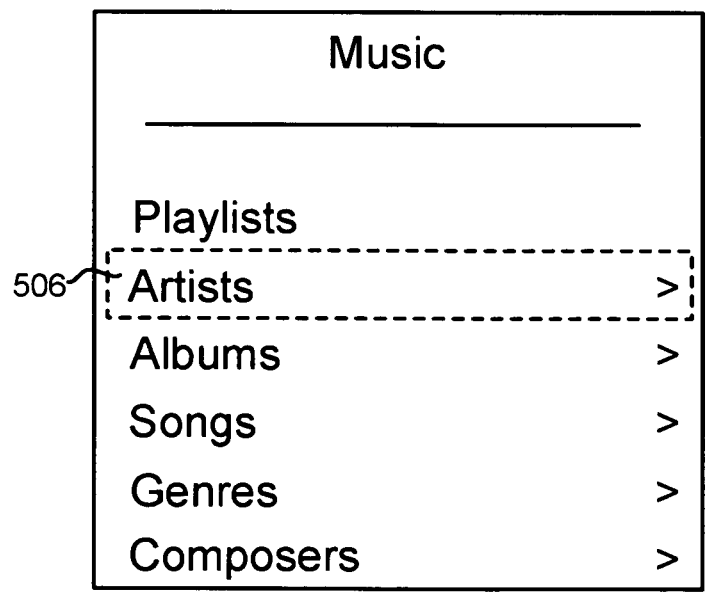

In FIG. 5*a*, the display screen 500 shows the main menu of the media player. The main menu has a plurality of menu options 502. The user 1 now selects the first menu option 504, "Music", and moves on to the display screen of FIG. 5*b*, where he scrolls to the second menu option 506, "Artists", and selects it. Arriving now at FIG. 5*c*, the user 1 may scroll in alphabetical order among all artists represented by at least one media file in the universal set of available media files 504. The user selects "Coldplay" at 508 and is then presented with all albums available for this artist. As seen in FIG. 5*d*, the user selects the album "X & Y" at 510.

Figure 5E:
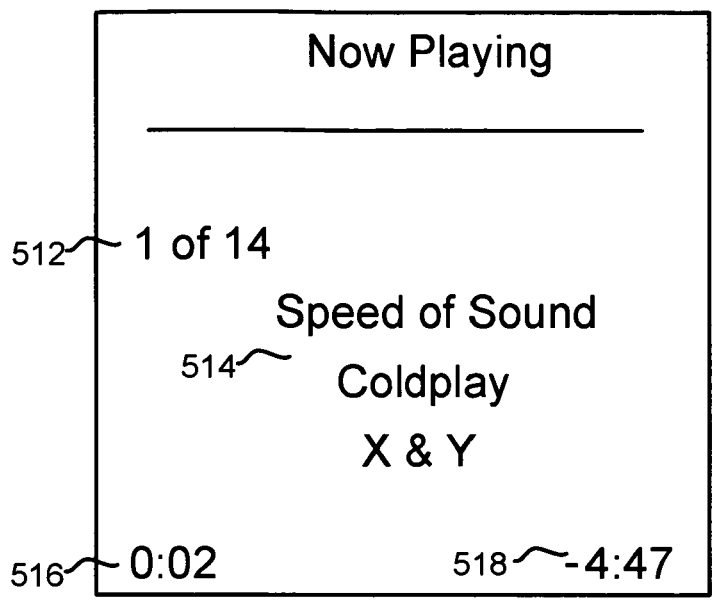

In FIG. 5*e*, the user 1 has commanded random play mode using the selected album attribute "X & Y" as constraint for the play criteria specification 402. As a result, the 14 tracks of this album will make up the set of currently selectable media files 406, and one of them will be selected randomly as current media file 508 in step 410 of the random mode loop 400, as seen at 512. Information about this current media file is shown at 514, 516 and 518.

Figure 5F:
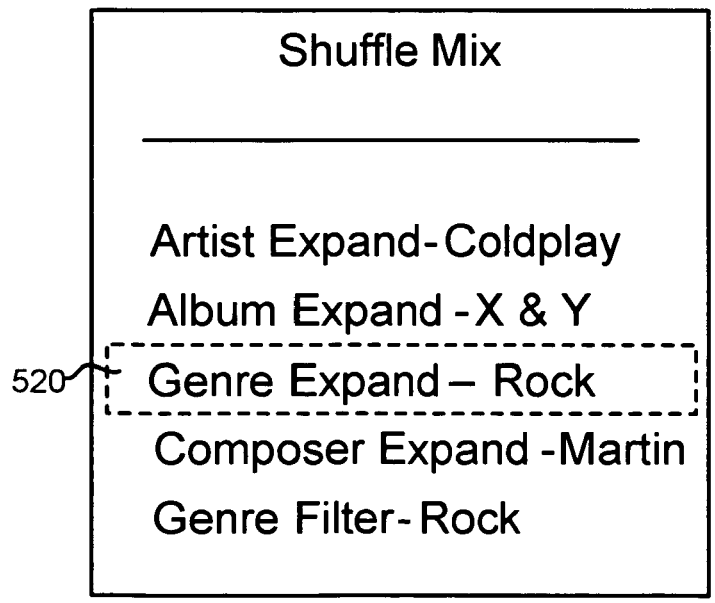

Now, by performing a certain action in the user interface of the portable media player apparatus 140, such as double or triple pressing the center button 147, the user 1 invokes the adaptable random play routine 420. Steps 422 and 424 thereof are executed as described above, and the resulting play criterion options are displayed as seen in FIG. 5f. The play criterion options include four expansive options and one narrowing option, all based on the determined attributes for the current media file 408. The user 1 selects the "Genre Expand—Rock" option 520 in step 428, which causes update in step 430 of the play criterion specification 402 to include this attribute in an expansive manner, i.e. by first removing the prevailing album constraint "X & Y" from the play criterion specification 402.

Figure 5G:
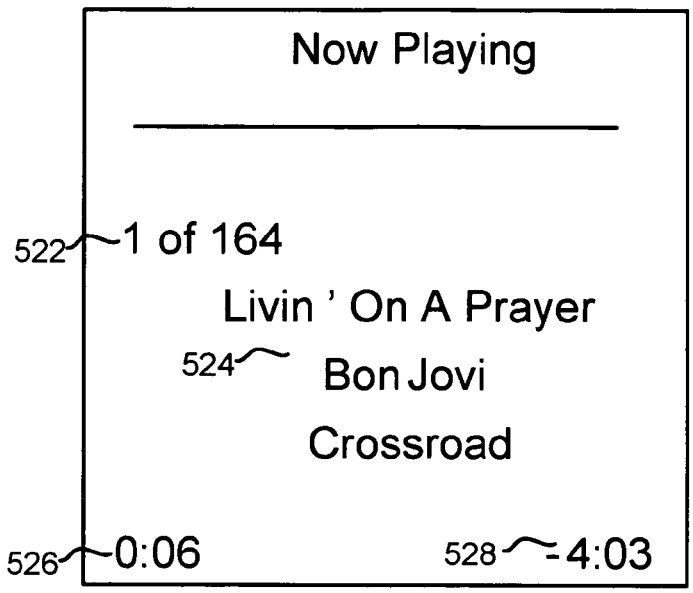

In effect, as seen at 522 in FIG. 5g, the set of currently selectable media files 406 will now include 164 different media files of the "Rock" Genre.

Figure 5H:
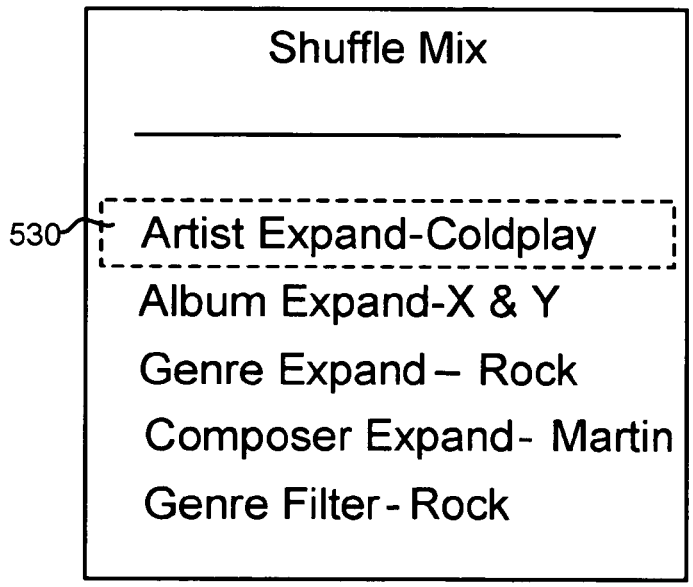
Figure 5I:
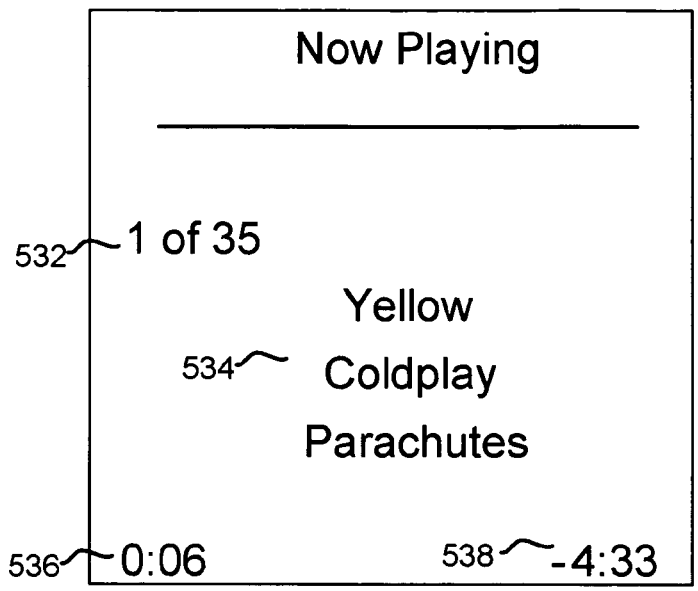

If, instead, the user would have chosen the play criterion option "Artist Expand—Coldplay" in FIG. 5f, as seen at 530 in FIG. 5h, the set of currently selectable media files 406 would have included 35 different media files having the attribute Artist="Coldplay" in common, as seen at 532 in FIG. 5i.

Figure 5J:
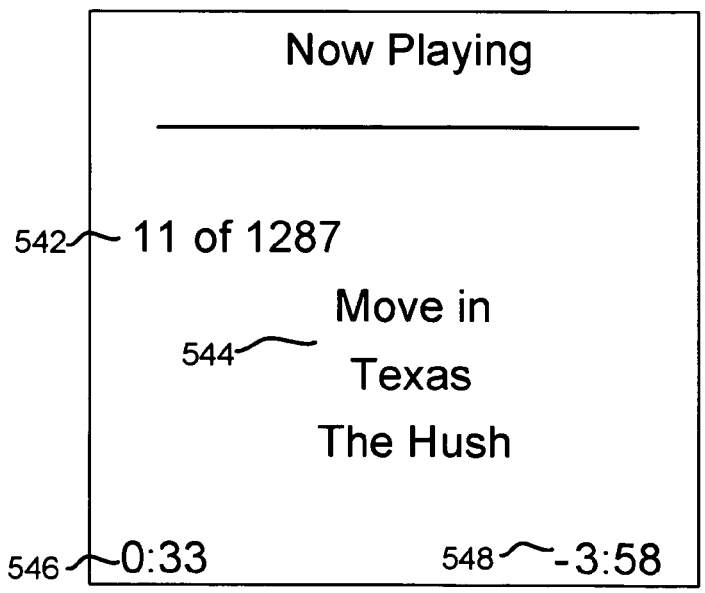
Figure 5K:
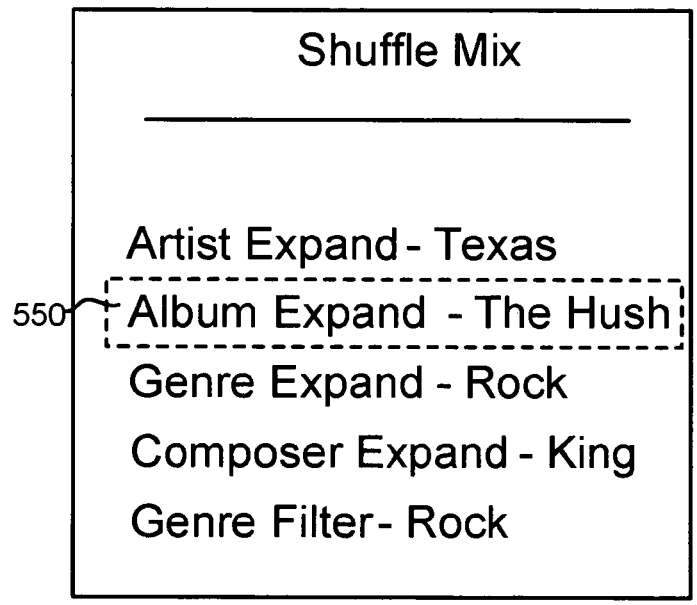
Figure 5L:
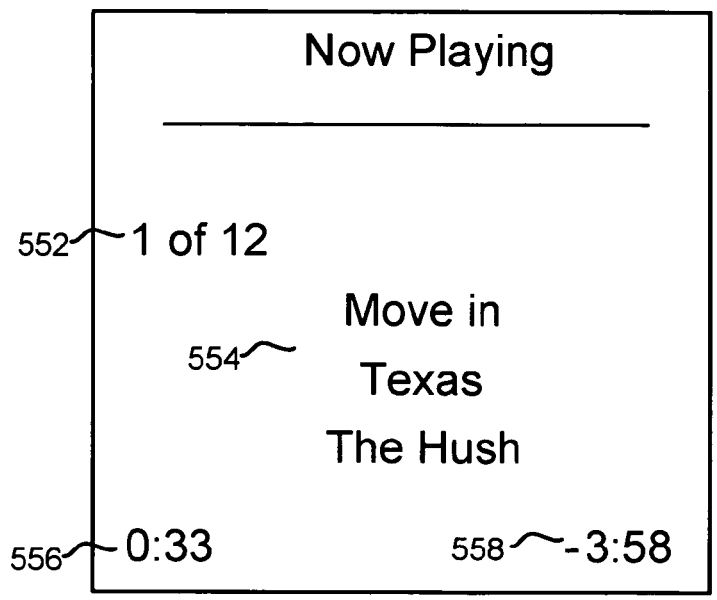

FIGS. 5j-l illustrate another use case. It is assumed in FIG. 5j that the user has commanded random play based on all 1287 files in the universal set 404 of available media files.

In FIG. 5k, the user 1 selects the play criterion option "Album Expand—The Hush" at 550, causing updating in step 430 of the play criterion specification 402 to include the attribute. The 12 media files that match this album attribute will be played by the random mode loop 400, as seen in FIG. 5l.

Thus, as seen from the use cases above, embodiments of the invention may be particularly useful in situations such as the following:

When listening randomly to all songs on the device, the user thinks "Hey, I like this artist, let me hear a few more songs from them".

When listening to random songs from a playlist, the user thinks "Hey, I like this album, let me hear a few more songs from the album instead of my playlist".

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method, comprising:
    providing a user-configurable play criteria specification via a user interface for media files,
    via the user interface, automatically selecting and performing a current media file having at least one attribute in compliance with the play criteria specification, said selecting being responsive to a criteria specification of more than one play criterion option combined in various logical combinations including the logical combination of a selection designating one attribute and negation of another attribute, and wherein the at least one attribute includes an aspect of a media file separate from an identification of the media file,
    during the performing of the current media file, detecting an input indicative of a desired play criterion, said desired play criterion being related to at least one attribute of said current media file; and
    updating said play criteria specification, without interrupting the performing of the current media file, to include said desired play criterion;
    wherein said user configurable play criteria specification comprises at least one criterion relating to an attribute of a media file, and
    wherein detecting an input comprises:
        determining a plurality of attributes of said current file from stored attributes;
        generating a plurality of user-selectable play criterion options from the determined attributes;
        displaying the generated play criterion options;
        detecting selection by a user of at least one of the play criterion options; and
        generating the desired play criterion from the or each selected play criterion option.

2. A method as defined in claim 1, further comprising automatically selecting and performing another media file having at least one attribute in compliance with the updated play criteria specification.

3. A method as defined in claim 1, wherein automatically selecting and performing another media file is performed when or after performance of said current media file has been completed.

4. A method as defined in claim 1, wherein said media files include audio files with music and wherein said desired play criterion is related to at least one attribute belonging to the group consisting of: album, artist, composer, genre, title, temporal origin, and storage location.

5. A method as defined in claim 1, wherein said media files include digital images and wherein said desired play criterion is related to at least one attribute belonging to the group consisting of: author/creator, genre, theme/subject, temporal origin, and storage location.

6. A method as defined in claim 1, wherein said media files include digital video or audio/video sequences and wherein said desired play criterion is related to at least one attribute belonging to the group consisting of: author, producer, director, actor(s), genre, title, episode, season, temporal origin, and storage location.

7. A method as defined in claim 1, further comprising media files which are available for automatic selection including at least one media file of a first media type, and said current media file being of a second media type, wherein said desired play criterion is related to said second media type as an attribute of said current media file.

8. A method as defined in claim 1, wherein updating said play criteria specification involves adding said desired play criterion to any existing criterion in said play criteria specification.

9. A method as defined in claim 1, wherein updating said play criteria specification involves deleting any existing criterion in said play criteria specification before including said desired play criterion.

10. A method as defined in claim 1, wherein the play criteria specification is an automatic file selection and playback filter for use by a media player in a random or shuffle mode.

11. An apparatus comprising:
    a controller and a user interface with an output device and an input device, the controller being adapted to automatically select and perform a current media file having at least one attribute in compliance with a play criteria specification, wherein the at least one attribute includes an aspect of a media file separate from an identification of the media file, and wherein the controller is further adapted to:
    detect, during performance of the current media file, an input from said input device indicative of a desired play criterion having at least one attribute of said current media file, the controller being responsive to selections of more than one play criterion option combined in various logical combinations including the logical combination of a selection designating one attribute and negation of another attribute; and wherein the controller is further adapted to:

determine a plurality of attributes of said current media file from stored attributes;

generate a plurality of user-selectable play criterion options from the determined attributes;

display the generated play criterion options;

detect selection by a user of at least one of the play criterion options; and generate the desired play criterion from the or each selected play criterion option; and update said play criteria specification to include said desired play criterion without interrupting the performance of the current media file, wherein said user-configurable play criteria specification comprises at least one criterion relating to an attribute of a media file.

12. An apparatus as defined in claim 11, wherein the controller is further adapted to automatically select and perform another media file having at least one attribute in compliance with the updated play criteria specification.

13. An apparatus as defined in claim 11, wherein the controller is adapted to provide the play criteria specification as an automatic file selection and playback filter for use by a media player in a random or shuffle mode.

14. An apparatus as defined in claim 11, embodied in or as an apparatus selected from the group consisting of a portable media player apparatus for digital media files, a mobile communication terminal, a palmtop computer, a personal computer, a compact disk player, a digital versatile disk player, a minidisk player, a game console, a digital camera, a home stereo or a car stereo.

15. A computer program product stored in a memory comprising machine-readable instructions that, when executed by a processor, performs the method according to claim 1.

* * * * *